United States Patent
Sakai

(10) Patent No.: US 6,798,671 B1
(45) Date of Patent: Sep. 28, 2004

(54) SWITCHING POWER SUPPLY UNIT

(75) Inventor: Hiroshi Sakai, Takefu (JP)

(73) Assignee: Orion Electric Company, Ltd., Fukui-ken (JP)

( * ) Notice: Subject to any disclaimer, the term of this patent is extended or adjusted under 35 U.S.C. 154(b) by 0 days.

(21) Appl. No.: 10/457,559

(22) Filed: Jun. 10, 2003

(30) Foreign Application Priority Data

Mar. 25, 2003 (JP) ........................................ 2003-082075

(51) Int. Cl.[7] ............................................ H02M 3/335
(52) U.S. Cl. ........................ 363/19; 363/21.16; 363/97
(58) Field of Search ........................ 363/18, 19, 21.12, 363/21.15, 21.16, 21.17, 97, 131, 142, 143; 323/902

(56) References Cited

U.S. PATENT DOCUMENTS 5,995,385 A * 11/1999 Shimamura ............... 363/21.16
6,295,211 B1 * 9/2001 Nishida et al. ................ 363/19
6,529,392 B2 * 3/2003 Nishida et al. ........... 363/21.16

FOREIGN PATENT DOCUMENTS

JP          07-007940          6/1993

* cited by examiner

*Primary Examiner*—Jessica Han
(74) *Attorney, Agent, or Firm*—Reed Smith LLP; Stanley P. Fisher, Esq.; Juan Carlos A. Marquez, Esq.

(57) ABSTRACT

The present invention provides a worldwide compatible switching power supply unit of an RCC system in which by reducing the number of components or parts, reduction of cost can be realized and the mounting space can be reduced. In a high input voltage and in a light load, an inductance of a primary winding of a transistor is set high but in the range of not exceeding a rated value of a main switching element, and in a low input voltage and in a heavy load, an inductance of a primary auxiliary winding and values of a control resistor and a capacitor of the main switching element are set low but in the range of not deteriorating the starting characteristics of the main switching element.

1 Claim, 2 Drawing Sheets

SWITCHING POWER SUPPLY UNIT

BACKGROUND OF THE INVENTION

1. Field of the Invention

The present invention relates to a self-excitation type switching power supply unit for supplying a stabilized D.C. voltage to an electronic apparatus for industrial use or consumer use.

2. Description of the Related Art

FIG. 2 is a circuit diagram schematically showing a configuration of an example of an electronic apparatus which is adapted to be operated with an A.C. power supply. In the figure, as an A.C. voltage Vac of an A.C. power supply 11, there are a 100 V system (e.g., in the range of 90 V to 130 V) and a 200 V system (e.g., in the range of 180 V to 260 V). Thus, as for electronic apparatuses as well, there are an electronic apparatus having a corresponding power supply voltage of the 100 V system, an electronic apparatus having a corresponding power supply voltage of the 200 V system, and a worldwide compatible electronic apparatus corresponding to both the power supply voltage of the 100 V system and the power supply voltage of the 200 V system.

Next, the configuration of the apparatus shown in FIG. 2 will be described. An A.C. voltage Vac supplied from an A.C. power supply 11 is converted into a D.C. voltage Vin in a rectification portion 12. The rectification portion 12 includes a diode D10 for rectification, and a capacitor C10 for rectification. Moreover, the D.C. voltage Vin is converted into a D.C. voltage Vout necessary for the operation of an electronic apparatus 13 in a D.C./D.C. conversion portion 10. A switching power supply unit is often used as the D.C./D.C. conversion portion 10.

In addition, as for the electronic apparatus 13 adapted to be operated by being supplied with the D.C. voltage Vout, there are many cases where the apparatus is provided with a control portion 14 using a microcomputer or the like. In one example of the control performed in the control portion 14, a switch 15 is controlled to change over ON and OFF of the D.C. voltage to be supplied to the electronic circuit 16. Then, for example, the control portion 14 which has received a signal from a remote control transmitter (not shown) cuts off the D.C. voltage to be applied to the electronic circuit 16 (standby state), or applies the same (operation state). Thus, the power supply is turned ON/OFF by the remote control transmitter.

FIG. 3 is a circuit diagram showing a configuration of a switching power supply unit of an RCC (Ringing Choke Converter) system which is conventionally used in relatively small electronic apparatuses. Note that, as a conventional example of this sort, JP 7-7940 A is given.

In the figure, a switching power supply unit 2 is provided with a transformer T having a primary winding N1, a primary auxiliary winding N2 and a secondary winding N3 the polarities of which are indicated by black circle symbols in the figure. The primary winding N1 side of the transformer T corresponds to a so-called D.C. voltage input side. Then, a main switching element Q1 comprised of a power MOS FET is operatively connected in series with the primary winding N1. One end of the primary winding N1 is operatively connected to an input terminal A on a high potential side of a D.C. voltage, and a drain of the main switching element Q1 is operatively connected to an input terminal GND on a low potential side of the D.C. voltage. In addition, a starting resistor R1 is operatively connected between an input terminal A and a gate of the main switching element Q1.

In addition, series-connected resistor R2 and capacitor C1 are operatively connected between one end of the primary auxiliary winding N2 and the gate of the main switching element Q1. In a control circuit including an NPN type transistor Q2 and an NPN type phototransistor PT, a collector of the transistor Q2 is operatively connected to the gate of the switching element Q1, while an emitter of the transistor Q2 is operatively connected to an input terminal GND. An emitter of the phototransistor PT is operatively connected to a base of the transistor Q2, and a collector of the phototransistor PT is operatively connected to the primary auxiliary winding N2 through a resistor R3. In addition, the base of the transistor Q2 is operatively connected to one end of a capacitor C2 which will be described later.

In an overcurrent protection circuit including a resistor R6, a Zener diode D3 and a capacitor C2, the resistor R6 and the capacitor C2 are connected in series with each other with one end of the capacitor C2 is operatively connected to the input terminal GND. The entirety of the overcurrent protection circuit is operatively connected in parallel with the primary auxiliary winding N2. The Zener diode D3 and the resistor R6 are operatively connected in parallel with each other. In addition, a node between the resistor R6 and the capacitor C2 is operatively connected to the base of the above-mentioned transistor Q2.

The secondary winding N3 side of the transformer T corresponds to a so-called rectification output side (output portion). The diode D2 for rectification is connected in series with the secondary winding N3 of the transformer T. A cathode side of the diode D2 and one end of the secondary winding N3 are operatively connected to an output terminal B and an output terminal GND, respectively. A smoothing capacitor C3 is operatively connected between the output terminal B and the output terminal GND, and a voltage detection circuit is provided in the after stage of the smoothing capacitor C3.

The voltage detection circuit includes voltage division resistors R4 and R5, a light emitting diode LED, and a shunt regulator IC1. The voltage division resistors R4 and R5 are connected in series with each other between the output terminal B and the output terminal GND, and are connected in parallel with the light emitting diode LED constituting a photocoupler together with the phototransistor PT, and the shunt regulator IC1. The light emitting diode LED and the shunt regulator IC1 are also connected in series with each other between the output terminal B and the output terminal GND. In addition, a node between the voltage division resistors R4 and R5 is operatively connected to a terminal R of the shunt regulator IC1.

The description will hereinbelow be given with respect to the operation of the switching power supply unit having the above-mentioned configuration. First of all, upon application of the D.C. voltage Vin across the input terminal A and the input terminal GND, a voltage which is equal to or larger than a threshold voltage is applied to the gate of the main switching element Q1 through the starting resistor R1, and the main switching element Q1 is turned ON. As a result, the D.C. voltage Vin is applied to the primary winding N1 of the transformer T. Upon application of the D.C. voltage Vin to the primary winding N1, a voltage in the same direction as that of the primary winding N1 is induced in the primary auxiliary winding N2. Then, the induced voltage is applied to the gate of the main switching element Q1 through the capacitor C1 and the resistor R2, so that the main switching element Q1 is held in an ON state.

During the turn-ON time period of the main switching element Q1, the capacitor C2 is charged with electricity originated from currents which are caused to flow through a path having the resistor R2, the capacitor C1 and the phototransistor PT, and a path having the resistor R6 and the Zener diode D1, respectively. Thus, the capacitor C2 is charged with electricity in accordance with a time constant based on constants of the elements forming the above-mentioned paths. Then, at the time when a base-to-emitter voltage of the transistor Q2 has been increased up to a level equal to or higher than a threshold voltage (e.g., 0.6 V), the transistor Q2 is turned ON so that a voltage at the gate of the switching element Q1 is rapidly decreased to turn OFF the main switching element Q1. Then, the energy accumulated while the main switching element Q1 is held in the ON state is transmitted from the primary winding N1 to the secondary winding N3.

The energy received from the primary winding N1 is discharged from the secondary winding N3 to the rectification output side. Then, the D.C. voltage Vout rectified by the diode D2 and smoothed by the smoothing capacitor C3 is outputted through the output terminal B and the output terminal GND.

On the other hand, while the D.C. voltage Vout is outputted on the rectification output side, the capacitor C2 is reset to wait for the next switching of the ON state of the main switching element Q1. At this time, a base-to-emitter voltage of the transistor Q2 is decreased, and the transistor Q2 is turned OFF. However, since a down voltage is induced in the primary auxiliary winding N2, the main switching element Q1 is held in an OFF state.

Upon completion of the discharge of the rectified output energy, the ringing is caused in the primary auxiliary winding N2, and the electrostatic energy accumulated in a parasitic capacity of the primary auxiliary winding N2 is discharged to be converted into the energy of the primary auxiliary winding N2, and an up electromotive force is induced in the primary auxiliary winding N2. The voltage at this time is applied as the ringing pulse to the gate of the main switching element Q1 through the capacitor C1 and the resistor R2. Since the ringing pulse is set so as to become a voltage equal to or higher than the threshold voltage of the main switching element Q1, the main switching element Q1 is turned ON, and the D.C. voltage Vin is applied to the primary winding N1 again. The above-mentioned oscillation operation is repeatedly carried out, whereby the D.C. voltage Vout continues to be outputted through the terminal B.

Now, the description will hereinbelow be given with respect to the control of the D.C. voltage Vout. When the D.C. voltage Vout is higher than a set value, since the voltage which has been voltage-divided with the voltage division resistors R4 and R5 of the voltage detection circuit to be inputted to the terminal R of the shunt regulator IC1 is higher than a reference voltage in the inside of the shunt regulator IC1, the shunt regulator SR increases a current caused to flow through the light emitting diode LED. As a result, a quantity of emitted light of the light emitting diode LED is increased and an impedance of the phototransistor PT1 on the light reception side is decreased.

Thus, during the turn-ON time period of the main switching element Q1, the adjustment is carried out in such a way that the charging current to the capacitor C2 is increased, and the base-to-emitter voltage of the transistor Q2 is rapidly increased up to a voltage equal to or higher than the threshold voltage so that the ON period of the main switching element Q1 becomes shorter all the more, i.e., the D.C. voltage Vout is decreased. On the other hand, when the D.C. voltage Vout is lower than the set value, the operation opposite to the foregoing is carried out, and the adjustment is carried out in such a way that the ON period of the main switching element Q1 becomes long, i.e., the D.C. voltage Vout is increased.

Next, the description will hereinbelow be given with respect to the operation of the overcurrent protection circuit. Charge time periods in a plus direction and in a minus direction of the capacitor C2 during a low input voltage and during a high input voltage are respectively determined in accordance with a time constant based on the constants of the elements forming the above-mentioned paths. Here, the above-mentioned time constant is adjusted to shift the start of the overcurrent protection to the heavier load side than that of the conventional art in a low input voltage to relax the fold-back drooping characteristics, and also to make the start of the overcurrent protection in a high input voltage close to that in a low input voltage.

That is to say, a value of the resistor R6 is set so that in the low input voltage, the charge time period of the capacitor C2 during the turn-ON time period of the main switching element Q1 is lengthened (a charge time constant is made larger), and also, the charge time period in a minus direction of the capacitor C2 during the turn-OFF time period of the main switching element Q1 is shortened (a charge time constant is decreased). At the same time, a charge time constant of the capacitor C2 during the turn-ON time period of the main switching element Q1 is adjusted and set so that the drooping start load in the high input voltage adapted to allow the Zener diode D3 to conduct becomes identical to that in the low input voltage. A pulse width of a voltage induced in the primary auxiliary winding N2 during the turn-ON time period of the main switching element Q1 is controlled so as to become larger for the purpose of further increasing an output voltage (D.C. voltage Vout) as the load becomes heavier. However, the charge for the capacitor C2 at this time is carried out in accordance with the above-mentioned time constant, and hence after a lapse of a predetermined time period, the transistor Q2 is turned ON and the main switching element Q1 is turned OFF. Thus, at the time when the above-mentioned pulse width has reached a certain fixed size, the main switching element Q1 is turned OFF so that the switching power supply unit carries out the overcurrent protection operation.

In addition, in the stationary oscillation operation of the switching power supply unit, at the time when the main switching element Q1 is turned OFF, the capacitor C2 is charged with the electric charges oriented from a flyback voltage in a minus direction opposite to that during the turn-ON time period of the main switching element Q1. When the operation of the switching power supply unit proceeds to the overcurrent protection operation, the charging direction of the capacitor C2 approaches a plus side. Hence, the time period required for the base-to-emitter voltage of the transistor Q2 to reach the threshold becomes shorter, and thus, a turn-ON time period of the main switching element Q1 becomes even shorter. Consequently, the switching power supply unit shows the fold-back drooping characteristics in which an output voltage is reduced more and more as the load impedance is further decreased.

In general, in the switching power supply unit of the RCC system, a relationship between a load and an oscillation frequency is expressed on the basis of the following Expression:

$$f=\{1/(2L1 \times Po/\eta)\} \times \{Vin/(1+n3/ni \times Vin/Vout)^2\}$$

f: oscillation frequency

Po: load electric power

L1: inductance of the primary winding of the transformer T

η: electric power conversion efficiency n3: secondary winding of the transformer T n1: primary winding of the transformer T Vin: input voltage Vout: secondary output voltage Consequently, a relationship between the load electric power Po and the oscillation frequency f shows the inverse proportion. Thus, when the load electric power Po is reduced, the oscillation frequency f is increased and also the number of times of intermittence of the switching is increased. In general, in the switching circuit, it the number of times of intermittence of the switching is increased, then the switching loss is increased. Thus, loss in the main switching element Q1 is increased due to an increase in such oscillation frequency f.

In addition, if an output voltage is large, then the oscillation frequency f is also increased in proportion thereto. Since under a condition of a light load, the drain to source voltage of the main switching element Q1 is changed in an unsaturated state, and in particular, the voltage in a turn-ON state is increased to cause an overcurrent to flow, the electric power loss is increased most greatly.

Thus, conventionally, in order to prevent electric power loss from increasing most greatly in the high input voltage, the Zener diode D3 is provided in parallel with the resistor R6 to thereby quicken the start of the overcurrent protection operation of the main switching element Q1. That is to say, at the time of the high input voltage, the pulse voltage induced in the primary auxiliary winding N2 during the turn-ON time period of the main switching element Q1 is increased to exceed a Zener voltage of the Zener diode D3, the charging current caused to flow through the capacitor C2 is increased and hence, the base-to-emitter voltage of the transistor Q2 rapidly reaches the threshold so that the start of the overcurrent protection operation is quickened. In such a manner, The shift of an operating point of the overcurrent protection due to the magnitude of the input voltage is suppressed.

However, such a conventional switching power supply unit has a disadvantage in that a component or part, such as a Zener diode, for adjusting the shift of an overcurrent protection operating point is required for an overcurrent protection circuit, which results in the increase in a space required for mounting of a component or part and in the increase in costs.

SUMMARY OF THE INVENTION

The present invention has been made in view of the above-mentioned problems, and therefore has an object to provide a worldwide compatible switching power supply unit of an RCC system which is capable of carrying out the stable oscillation irrespective of the shift of the overcurrent protection operating point due to the magnitude of an input voltage.

A self-excitation type switching power supply unit according to a first aspect of the present invention includes: a transformer serving to output a D.C. voltage inputted to a primary winding as a flyback voltage through a secondary winding and having an auxiliary winding in which a feedback voltage from the primary winding and the secondary winding is induced;

a main switching element for switching input of a D.C. voltage to the primary winding; and an output portion for rectifying and smoothing the flyback voltage outputted through the secondary winding to output a D.C. voltage, in which:

an inductance of the primary winding of the transformer in a high input voltage and in a light load is set high within a range of not exceeding a rated value of the main switching element; and an inductance of the auxiliary winding and values of a control resistor and a capacitor of the main switching element in a low input voltage and in a heavy load are set low within a range of not deteriorating the oscillation characteristics of the main switching element.

As a result, it is possible to provide a worldwide compatible switching power supply unit of an RCC system which is cheap and is capable of carrying out the stable oscillation irrespective of the shift of the overcurrent protection operating point.

BRIEF DESCRIPTION OF THE DRAWINGS

The above and other objects as well as advantages of the present invention will become clear by the following description of the preferred embodiment of the present invention with reference to the accompanying drawings, wherein.

DETAILED DESCRIPTION OF THE PREFERRED EMBODIMENT

Figure 1:
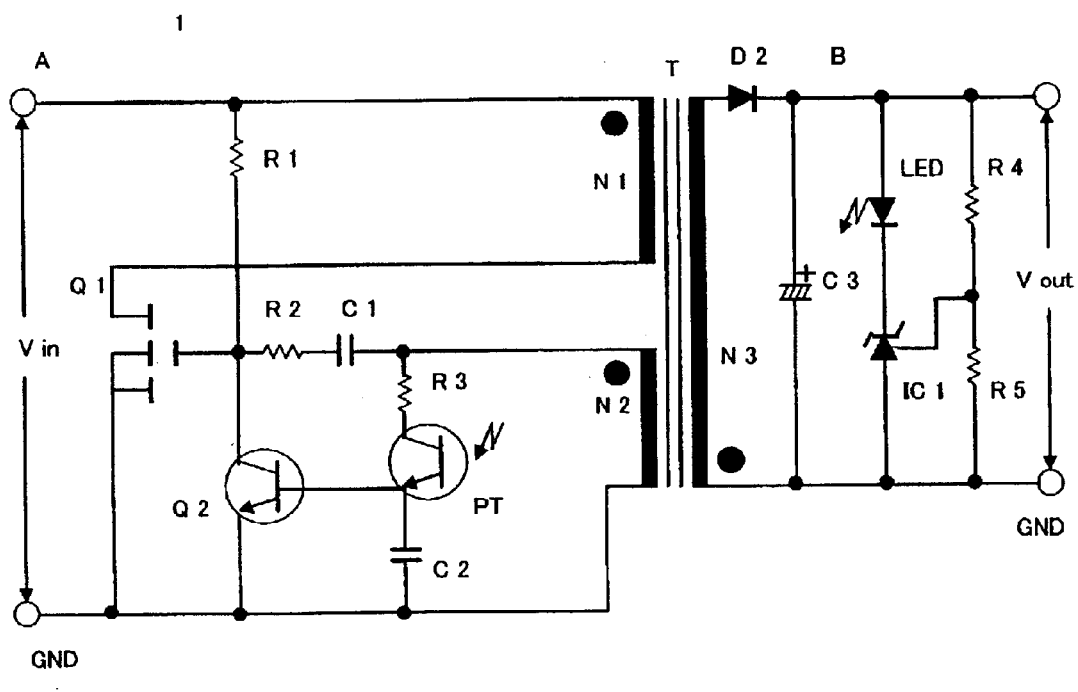
FIG. 1 is a circuit diagram showing a configuration of a switching power supply unit according to an embodiment of the present invention.

An embodiment of the present invention will hereinafter be described in detail with reference to FIG. 1. FIG. 1 is a circuit diagram showing a configuration of a switching power supply unit according to an embodiment of the present invention. In the figure, a switching power supply unit 1 is provided with a transformer T having a primary winding N1, a primary auxiliary winding N2 and a secondary winding N3, the polarities of which are indicated by black circle symbols in the figure. The primary winding N1 side of the transformer T corresponds to a so-called D.C. voltage input side. Then, a main switching element Q1 composed of a power MOS FET is connected in series with the primary winding N1, and one end of the primary winding N1 and a drain of the main switching element Q1 are operatively connected to an input terminal A on a higher electric potential side of a D.C. voltage, and an input terminal GND on a lower electric potential side of the D.C. voltage, respectively. In addition, a starting resistor R1 is operatively connected and provided between an input terminal A and a gate of the switching element Q1.

Figure 2:
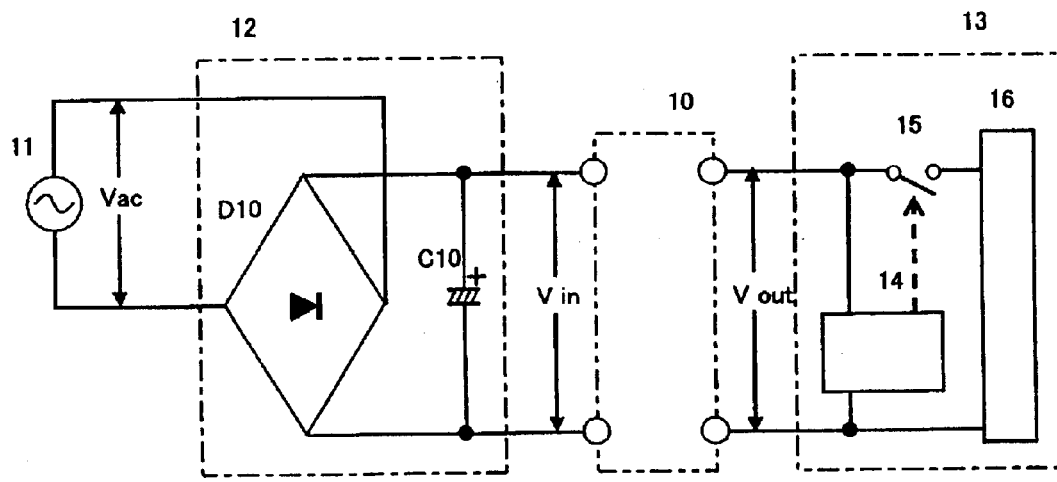
FIG. 2 is a circuit diagram, partly in block diagram, schematically showing a configuration of an electronic apparatus adapted to be operated with an A.C. power supply.
Figure 3:
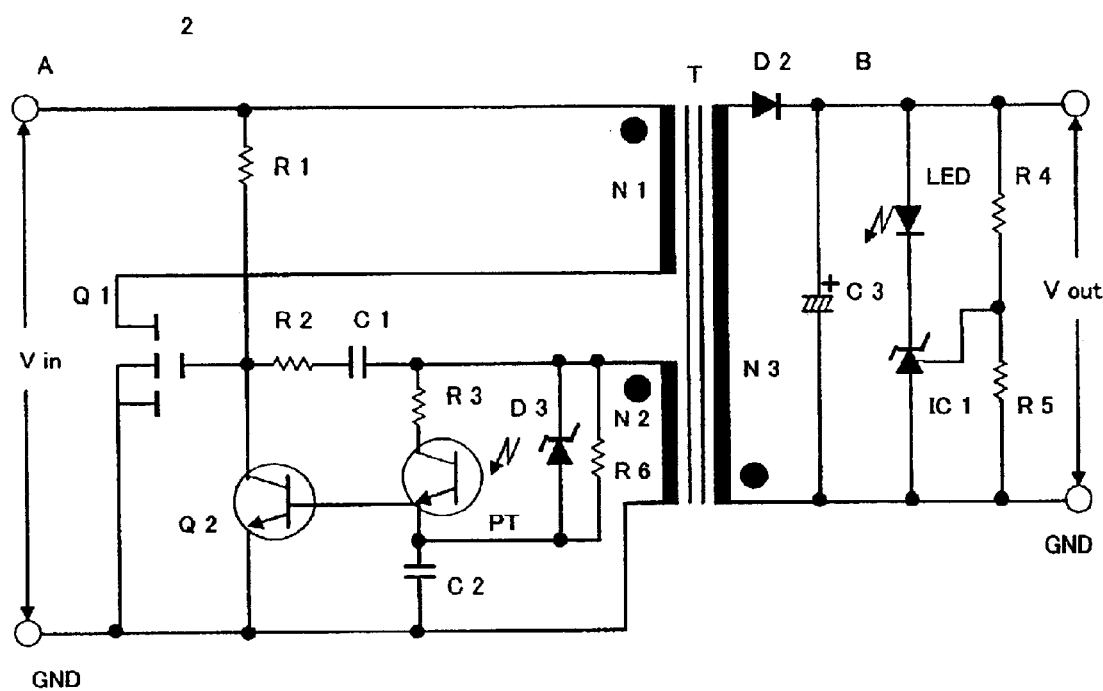
FIG. 3 is a circuit diagram showing a configuration of a conventional power supply.

Here, an inductance of the primary winding N1 is previously set to a large value but in the range of not exceeding a rated value of the main switching element Q1 in a high input voltage and in a light load. As one example, if an electronic apparatus has a configuration as shown in FIG. 2 and also, is of a worldwide compatible, then when the A.C. voltage Vac of the A.C. power supply 11 is 260 V, the high input voltage is provided, and when the switch 15 for a D.C. voltage to be supplied to the electronic circuit 16 is in an OFF state (in a standby state), the light load is provided.

Thus, the inductance of the primary winding N1 is set to a large value so that when the A.C. voltage Vac is 260 V and also, the switch 15 is in an OFF state (in a standby state), the oscillation frequency is obtained in the range of not exceeding a rated frequency of the main switching element Q1 (e.g., in the range of not exceeding 200 kHz).

Next, a resistor R2 and a capacitor C1 are connected and provided in series with each other between one end of the primary auxiliary winding N2 and the gate of the main switching element Q1. In a control circuit including an NPN type transistor Q2 and an NPN type phototransistor PT, a collector of the transistor Q2 is operatively connected to the gate of the main switching element Q1, while one emitter of the transistor Q2 is operatively connected to an input terminal GND. An emitter of the phototransistor PT is operatively connected to a base of the transistor Q2, and a collector of the phototransistor PT is operatively connected to the primary auxiliary winding N2 through a resistor R3. In addition, the base of the transistor Q2 is operatively connected to one end of a capacitor C2 which will be described later.

Here, the inductance of the primary auxiliary winding N2 and values of the resistor R2 and the capacitor C1 are respectively previously set to small values so that the oscillation does not become unstable in the low input voltage and in the heavy load. As one example, if an electronic apparatus has a configuration shown in FIG. 2, and also, is of a worldwide compatible, then when the A.C. voltage Vac of the A.C. power supply 11 is 90 V, the low input voltage is provided, and when the switch 15 for the D.C. voltage to be supplied to the electronic circuit 16 is in an ON state (in an operation state), the heavy load is provided. Consequently, the inductance of the primary auxiliary winding N2, and the values of the resistor R2 and the capacitor C1 are respectively previously set to small values so that when the A.C. voltage Vac is 90 V and also, the switch 15 is in a turn-ON state (in an operation state), the oscillation does not become unstable.

The secondary winding N3 side of the transformer T corresponds to a so-called rectification output side (output portion). The diode D2 for rectification is connected in series with the secondary winding N3. A cathode side of the diode D2 and one end of the secondary winding N3 are operatively connected to an output terminal B on a higher electric potential side and the output terminal GND on a lower electric potential side, respectively. A smoothing capacitor C3 is operatively connected between the output terminal B and the output terminal GND, and a voltage detection circuit is provided in the after stage of the smoothing capacitor C3.

The voltage detection circuit includes voltage division resistors R4 and R5, a light emitting diode LED, and a shunt regulator IC1. The voltage division resistors R4 and R5 are connected in series with each other between the output terminal B and the output terminal GND, and are connected in parallel with the light emitting diode LED constituting a photocoupler together with the phototransistor PT, and the shunt regulator IC1. The light emitting LED and the shunt regulator IC1 are also connected in series with each other between the output terminal B and the output terminal GND. In addition, a node between the voltage division resistors R4 and R5 is operatively connected to a terminal R of the shunt regulator IC1.

The description will hereinbelow be given with respect to the operation of the switching power supply unit 1 having the above-mentioned configuration. First of all, upon application of the D.C. voltage Vin across the input terminal A and the input terminal GND, a voltage which is equal to or larger than a threshold voltage is applied to the gate of the main switching element Q1 through the starting resistor R1, and the main switching element Q1 is turned ON. As a result, the D.C. voltage Vin is applied to the primary winding N1 of the transformer T. Upon application of the D.C. voltage Vin to the primary winding N1, a voltage in the same direction as that of the primary winding N1 (feedback voltage) is induced in the primary auxiliary winding N2. Then, the induced voltage is applied to the gate of the main switching element Q1 through the capacitor C1 and the resistor R2, so that the main switching element Q1 is held in an ON state.

During the turn-ON time period of the main switching element Q1, the capacitor C2 is charged with electricity originated from currents which are caused to flow through a path having the resistor R2, the capacitor C1 and the phototransistor PT. Then, at the time when a base-to-emitter voltage of the transistor Q2 has been increased up to a level equal to a threshold voltage, the transistor Q2 is turned ON so that a voltage at the gate of the switching element Q1 is rapidly decreased to turn OFF the main switching element Q1. Then, the energy accumulated while the main switching element Q1 is held in the ON state is transmitted from the primary winding N1 to the secondary winding N3.

Since the secondary winding N3 is opposite in polarity to the primary winding N1, during the turn-ON time period of the main switching element Q1, a down voltage is induced in the secondary winding N3. However, since the diode D2 is biased in the reverse direction with that induced voltage, no current is caused to flow through the rectification output side. Thus, the moment when the main switching element Q1 has been turned OFF, an up back electromotive force (flyback voltage) is induced to discharge the energy received from the primary winding N1 to the rectification output side. Then, the D.C. voltage Vout rectified by the diode D2 and smoothed through the smoothing capacitor C3 is outputted through the output terminal B and the output terminal GND.

On the other hand, while the D.C. voltage Vout is outputted on the rectification output side, a down voltage (feedback voltage) is induced in the primary auxiliary winding N2, and the electric charges accumulated in the capacitor C2 is drawn with that voltage. Moreover, the electric charges are accumulated in the capacitor C2 in a minus direction opposite to that in the case of the turn-ON time period of the main switching element Q1 in correspondence to the magnitude of the input voltage (the D.C. voltage Vin). In this case, in the high input voltage as well as in the low input voltage, the capacitor C2 is charged with the electric charges originated from a current caused to flow through the path having the above-mentioned phototransistor PT in the reverse direction.

As a result, the capacitor C2 is reset for the purpose of providing for next switching of the turn-ON state of the main switching element Q1. At this time, the base-to-emitter voltage of the transistor Q2 is decreased to turn OFF the transistor Q2. However, since the down voltage is induced in the primary auxiliary winding N2, the voltage at the gate of the main switching element Q1 is held at a low level and hence the main switching element Q1 is left in a turn-OFF state.

Upon completion of the discharge of the energy on the rectification output side, the ringing is caused in the primary auxiliary winding N2, and the energy of the primary auxiliary winding N2 is discharged and an up electromotive force is induced in the primary auxiliary winding N2. The voltage at this time is applied as the ringing pulse to the gate of the main switching element Q1 through the capacitor C1 and the resistor R2. Since the ringing pulse is set so as to become a voltage equal to or higher than the threshold voltage of the main switching element Q1, the main switching element Q1 is turned ON, and the D.C. voltage Vin is applied to the primary winding N1 again. The above-mentioned oscillation operation is repeatedly carried out, whereby the D.C. voltage Vout continues to be outputted through the terminal B.

Now, the description will hereinbelow be given with respect to the control of the D.C. voltage Vout. When the D.C. voltage Vout is higher than a set value, since the voltage which has been voltage-divided with the voltage division resistors R4 and R5 of the voltage detection circuit to be inputted to the terminal R of the shunt regulator IC1 is higher than a reference voltage in the inside of the shunt regulator IC1, the shunt regulator SR increases a current caused to flow through the light emitting diode LED. As a result, a quantity of emitted light of the light emitting diode LED is increased and an impedance of the phototransistor PT1 on the light reception side is decreased.

Thus, during the turn-ON time period of the main switching element Q1, the adjustment is carried out in such a way that the charging current to the capacitor C2 is increased, and the base-to-emitter voltage of the transistor Q2 is rapidly increased up to a voltage equal to or higher than the threshold voltage so that the turn-ON time period of the main switching element Q1 becomes shorter all the more, i.e., the D.C. voltage Vout is decreased. On the other hand, when the D.C. voltage Vout is lower than the set value, the operation opposite to the foregoing is carried out, and the adjustment is carried out in such a way that the turn-ON time period of the main switching element Q1 becomes long, i.e., the D.C. voltage Vout is increased.

Next, the description will hereinbelow be given with respect to the oscillation operations in the high input voltage and in the low input voltage. In this embodiment, there is not provided the Zener diode of the overcurrent protection circuit inherent in the conventional art. Thus, since the turn-ON time period of the main switching element Q1 is shortened in the high input voltage, the transference of the operation to the current limitation operation is delayed all the more. This is not preferable in terms of the rating of an element used. For this reason, the inductance of the primary winding N1 is previously set to a large value but in the range of not exceeding the rated value of the main switching element Q1 in the light load as well as in the high input voltage. Thus, the loss of the main switching element Q1 is prevented from excessively becoming large to exceed the rated value in the light input voltage as well as in the low input voltage.

In addition, in the low input voltage and in the heavy load, the turn-ON time period of the main switching element Q1 required to fetch an output voltage for a load becomes longer than that when the input voltage is high, and hence, the oscillation becomes unstable. For this reason, the inductance of the primary auxiliary winding N2, and the values of the resistor R2 and the capacitor C1 are respectively previously set to the small values so that the oscillation does not become unstable in the heavy load as well as in the low input voltage. Thus, the oscillation does not become unstable in the heavy load as well as in the low input voltage.

Note that, while in the above-mentioned embodiment, the description has been given with respect to the case where the power MOS FET is used as the main switching element Q1, it is to be understood that the present invention may also be applied to a switching power supply unit circuit of an RCC system using a transistor as the main switching element Q1. In addition, while the description has been given with respect to the case where the A.C. voltage of the A.C. power supply is of a worldwide compatible as an example of the low input voltage and the high input voltage, the present invention is not intended to be limited to the case where the A.C. voltage is a 100 V system or a 200 V system. Thus, the present invention may also be applied to any D.C. voltage inputted to a switching power supply unit circuit as long as it is changed. In addition, while as the light load and the heavy load, the standby state and the operation state have been given as examples, the present invention may also be applied to any load for a switching power supply unit circuit as long as it is changed.

As set forth hereinabove, according to the switching power supply unit of the present invention, there is offered the effect in that it is possible to provide the worldwide compatible switching power supply unit of an RCC system which is capable of carrying out the stable oscillation irrespective of the shift of the overcurrent protection operating point due to the magnitude of an input voltage.

In addition, there is offered the effect in that a component or part, such as a Zener diode, for adjusting the shift of the overcurrent protection operating point becomes unnecessary for the overcurrent protection circuit, and hence the number of components or parts can be reduced to realize cost-down to allow the mounting space to be reduced.

While the present invention has been particularly shown and described with reference to the preferred embodiment and the specified changes thereof, it will be understood that other changes and the various modifications will occur to those skilled in the art without departing from the scope and true spirit of the invention. The scope of the invention is, therefore, to be determined solely by the appended claims.

What is claimed is:

1. A self-excitation type switching power supply unit comprising:

a transformer serving to output a D.C. voltage inputted to a primary winding as a flyback voltage through a secondary winding and having an auxiliary winding in which a feedback voltage from the primary winding and the secondary winding is induced;

a main switching element for switching input of a D.C. voltage to the primary winding; and an output portion for rectifying and smoothing the flyback voltage outputted through the secondary winding to output a D.C. voltage, wherein:

an inductance of the primary winding of the transformer in a high input voltage and in a light load is set high within a range of not exceeding a rated value of the main switching element; and an inductance of the auxiliary winding and values of a control resistor and a capacitor of the main switching element in a low input voltage and in a heavy load are set low within a range of not deteriorating the oscillation characteristics of the main switching element.

* * * * *